US011405905B2

(12) United States Patent
Hwang et al.

(10) Patent No.: US 11,405,905 B2
(45) Date of Patent: Aug. 2, 2022

(54) METHOD AND USER EQUIPMENT FOR RECEIVING DOWNLINK CONTROL CHANNEL IN 5G MOBILE COMMUNICATION

(71) Applicant: LG Electronics Inc., Seoul (KR)

(72) Inventors: Daesung Hwang, Seoul (KR); Yunjung Yi, Seoul (KR); Duckhyun Bae, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 16/609,261

(22) PCT Filed: Apr. 16, 2018

(86) PCT No.: PCT/KR2018/004370
§ 371 (c)(1),
(2) Date: Oct. 29, 2019

(87) PCT Pub. No.: WO2018/203605
PCT Pub. Date: Nov. 8, 2018

(65) Prior Publication Data
US 2020/0053705 A1   Feb. 13, 2020

Related U.S. Application Data

(60) Provisional application No. 62/512,173, filed on May 29, 2017, provisional application No. 62/492,905, filed on May 1, 2017.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0051* (2013.01); *H04W 52/146* (2013.01); *H04W 52/36* (2013.01); *H04W 72/044* (2013.01)

(58) Field of Classification Search
CPC ... H04W 72/042; H04W 52/04; H04W 52/43; H04W 52/36; H04W 72/0466;
(Continued)

(56) References Cited

U.S. PATENT DOCUMENTS

2013/0188558 A1   7/2013  Nam et al.
2016/0218790 A1*  7/2016  Hwang .................. H04B 17/24
(Continued)

FOREIGN PATENT DOCUMENTS

KR   1020140037142   3/2014
KR   1020150068368   6/2015
(Continued)

OTHER PUBLICATIONS

AT&T, "Attachment of UE-ID for Common PDCCH," R1-1704350, 3GPP TSG RAN WG1 Meeting #88bis, Spokane, USA, Mar. 25, 2017, see sections 2, 3.
(Continued)

*Primary Examiner* — Jason E Mattis
*Assistant Examiner* — Robert Ma
(74) *Attorney, Agent, or Firm* — Dentons US LLP

(57) ABSTRACT

One disclosure of the present specification provides a method for receiving, by a user equipment (UE), a downlink control channel. The method may comprise a step of receiving a downlink control channel. The downlink control channel may be scrambled by a scrambling sequence. The scrambling sequence may be initialized by using a predetermined identifier which is different from an identifier (ID) of the UE.

15 Claims, 6 Drawing Sheets

(51) Int. Cl.
*H04W 52/14* (2009.01)
*H04W 52/36* (2009.01)

(58) Field of Classification Search
CPC ... H04L 5/0051; H04L 1/1887; H04L 5/0044; H04B 17/24
See application file for complete search history.

(56) References Cited

U.S. PATENT DOCUMENTS

2018/0070335 A1* 3/2018 Amuru ................. H04L 5/0044
2020/0028640 A1* 1/2020 Yeo ..................... H04L 1/1887

FOREIGN PATENT DOCUMENTS

WO WO-2013010349 A1 * 1/2013 ......... H04L 25/0226
WO WO-2018030625 A1 * 2/2018

OTHER PUBLICATIONS

Ericsson, "On Group Common PDCCH Structure and Configuration," R1-1706028, 3GPP TSG-RAN WG1 Meeting #88bis, Spokane, USA, Mar. 25, 2017, see section 2.

* cited by examiner

METHOD AND USER EQUIPMENT FOR RECEIVING DOWNLINK CONTROL CHANNEL IN 5G MOBILE COMMUNICATION

This application is the National Stage filing under 35 U.S.C. 371 of International Application No. PCT/KR2018/004370, filed on Apr. 16, 2018, which claims the benefit of U.S. Provisional Applications No. 62/492,905 filed on May 1, 2017, and No. 62/512,173 filed on May 29, 2017, the contents of which are all hereby incorporated by reference herein in their entirety.

BACKGROUND OF THE DISCLOSURE

Field of the Disclosure

The present disclosure relates to mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

In a next 5G system, introducing a method of significantly reducing a transmission latency according to an application field is considered. In particular, when it comes to uplink (UL) transmission, instead of an existing method of scheduling by use of a physical downlink control channel (PDCCH) (or an enhanced physical downlink control channel (EPDCCH) or an machine-type communication (MTC) physical downlink control channel (MPDCCH)) including a UL grant, introducing grant-free UL transmission, in which UL transmission starts by a determination made by a UE. is considered.

Meanwhile, when grant-free UL transmission is possible, a downlink control channel may be transmitted to the UE. However, there is a problem as to how to design the DL control channel.

SUMMARY OF THE DISCLOSURE

Accordingly, a disclosure of the present specification has been made in an effort to solve the aforementioned problem.

In an aspect, a method for receiving a downlink control channel by a user equipment (UE) is provided. The method may include receiving the downlink control channel. Here, the downlink control channel may be scrambled by a scrambling sequence. The scrambling sequence may be initialized using a preset identifier (ID) different from an ID of the UE.

The preset ID may be different from a cell ID.

The preset ID may be different from a cell-radio network temporary identifier (C-RNTI) that corresponds to the ID of the UE.

The method may further include, when the downlink control channel includes a first uplink (UL) grant, performing first UL transmission based on the first UL grant, and, even when a subsequent second UL grant is not received, performing second UL transmission.

When the first uplink grant includes a transmit power control (TPC), the TPC may be used to determine power for the first UL transmission and the second UL transmission.

When the second UL transmission is performed repeatedly, power ramping may be performed for the repetition.

When the downlink control channel indicates switching from a UL grant-free transmission scheme to a UL grant-based transmission scheme, the preset ID may be used.

When the downlink control channel indicates UL grant-based UL transmission and the UL transmission may correspond to re-transmission, the preset ID is used.

The preset ID may be set differently according to a time and frequency resource to which a demodulation reference signal (DMRS) is mapped.

In another aspect, a user equipment (UE) for receiving a downlink control channel is provided. The UE may include a transceiver and a configured to receive the downlink control channel by controlling the transceiver. Here, the downlink control channel may be scrambled by a scrambling sequence. The scrambling sequence may be initialized using a preset identifier (ID) different from an ID of the UE.

According to the disclosure of the present disclosure, the problem of the conventional technology described above may be solved.

Specifically, according to the disclosure of the present disclosure, it is possible to efficiently manage a resource in Grant-free UL transmission and Grant-based UL transmission.

DESCRIPTION OF EXEMPLARY EMBODIMENTS

Figure 1:
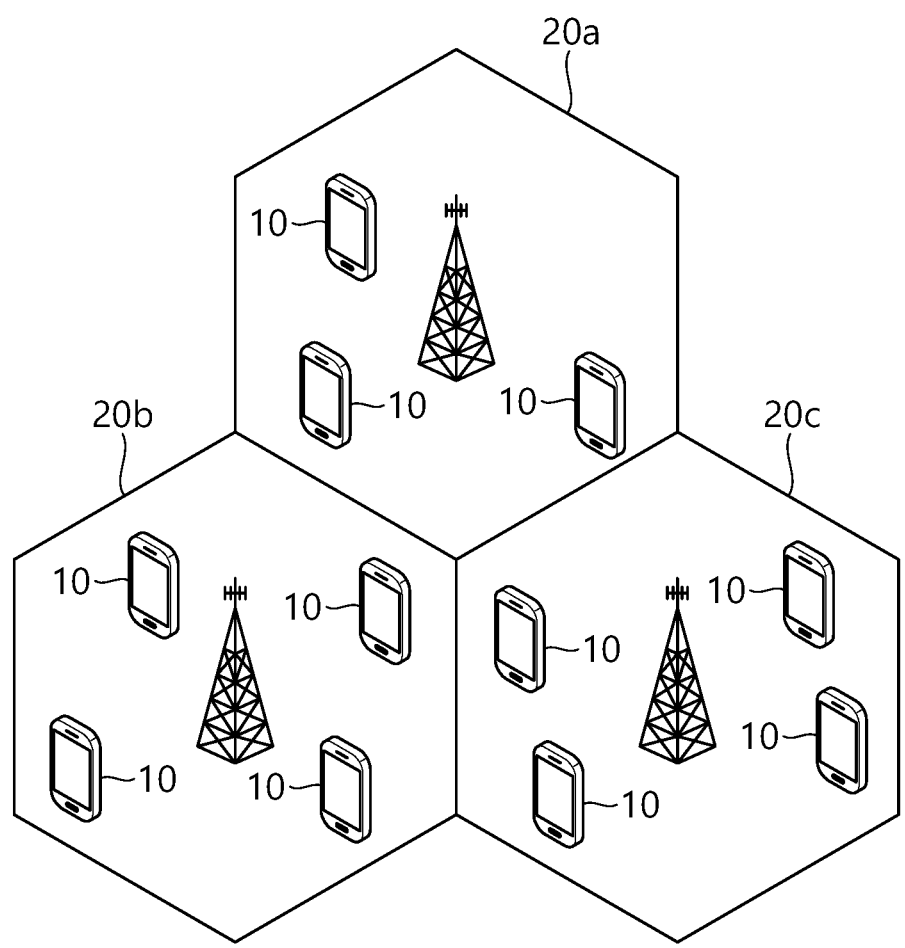
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
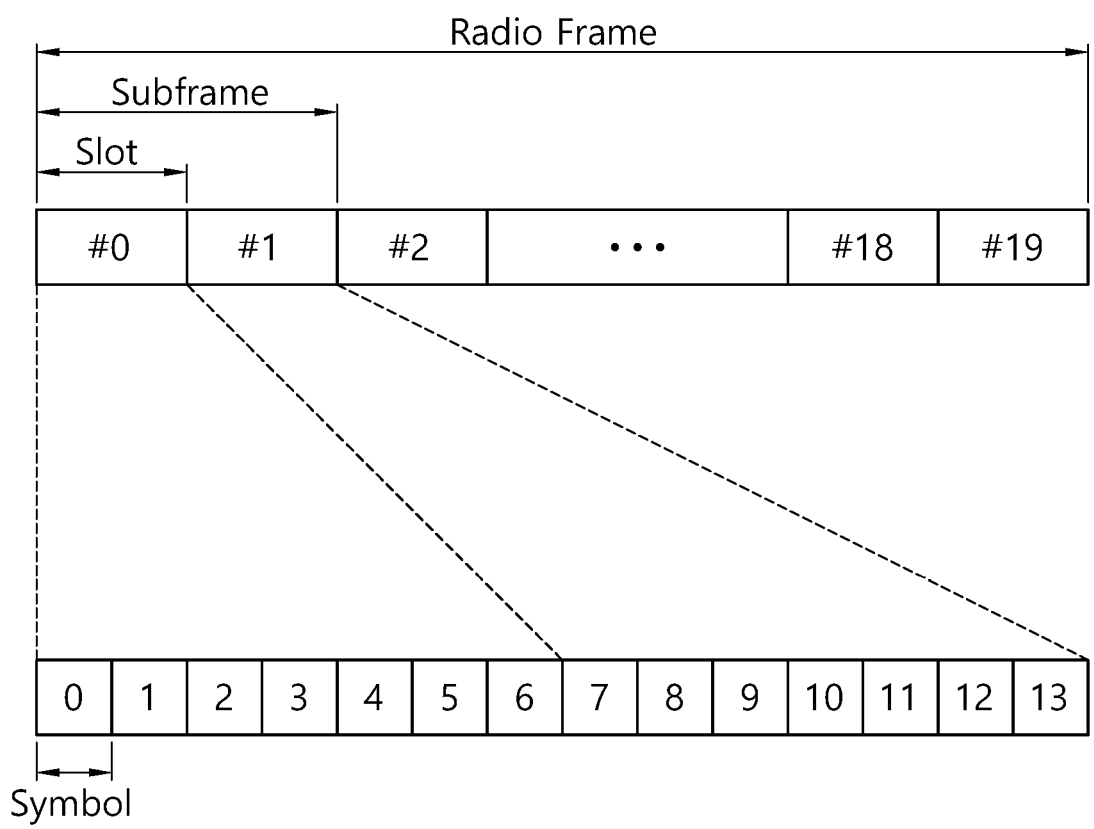
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
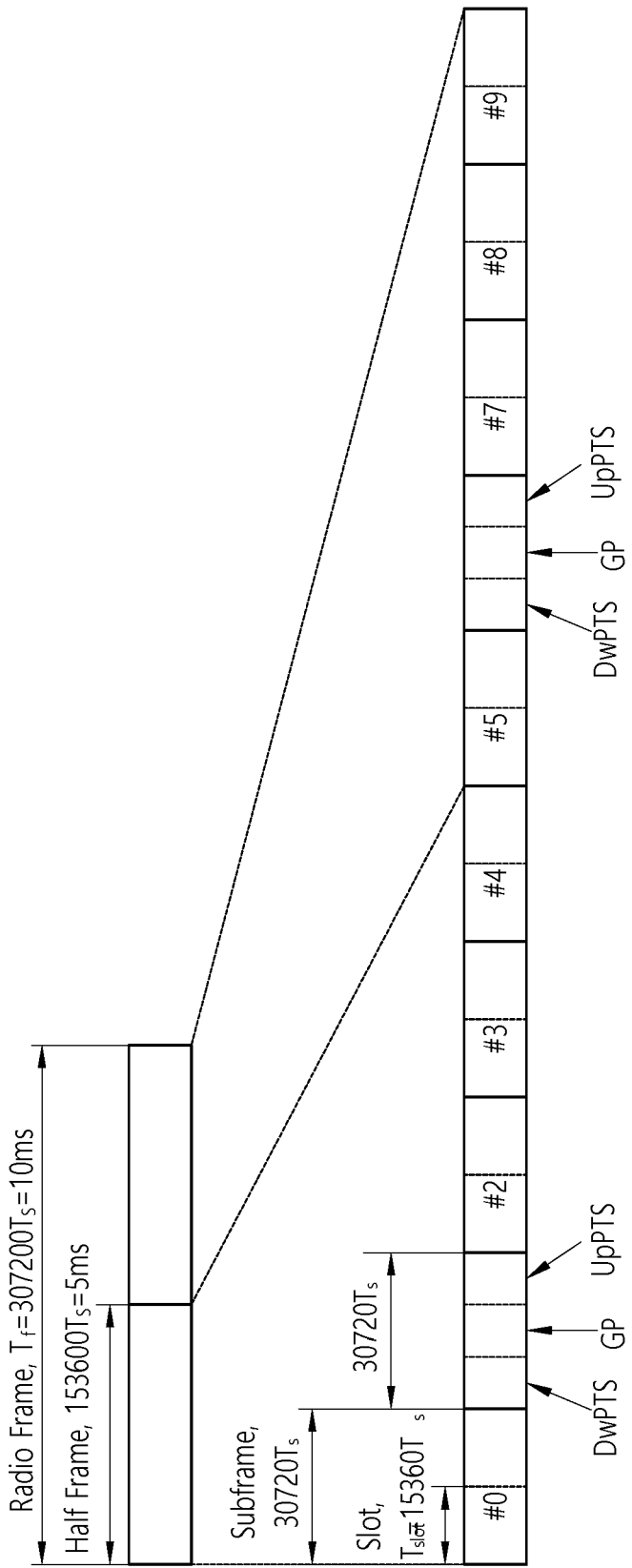
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Meanwhile, IoT will hereinafter be described in detail.

IoT refers to an exchange of information between IoT devices through a base station or an exchange of information between an IoT device and a server through a base station that does not accompany or require human interaction. As described above, according to the aspect that the IoT communication is carried out through a cellular base station, IoT communication is also referred to as a Cellular Internet of Things (CIoT).

The above-described IoT corresponds to a type of Machine Type Communication (MTC). Therefore, an IoT device may also be referred to as an MTC device.

Since IoT communication has the characteristics of a small transmission data size and non-frequent occurrence of uplink or downlink data transmission/reception, it is preferable to reduce the unit price of the IoT device in accordance with its low data transmission rate and to reduce its amount of battery power consumption. Additionally, since the IoT device has low mobility, it also has the characteristic of an almost-non-varying (or hardly varying) channel environment.

As a solution for reducing the cost (or achieving low-cost) of the IoT device, regardless of a system bandwidth of the cell, the IoT device may use a subband of approximately 1.4 MHz.

The IoT communication, which operates within a bandwidth that is reduced as described above, may be referred to as Narrow Band (NB) IoT communication or NB CIoT communication.

<Next Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (D2D) communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, it may be considered to use a downlink (DL) subframe for the reception from the base station and to use an uplink (UL) subframe for a transmission to the base station. This may be applied to a spectrum that is formed in pairs and to a spectrum that is not formed in pairs. A spectrum pair means that two carrier spectrums are included for the downlink and uplink operations. For example, in a spectrum pair, one carrier may include a downlink band and an uplink band that is paired with the downlink band.

Figure 4:
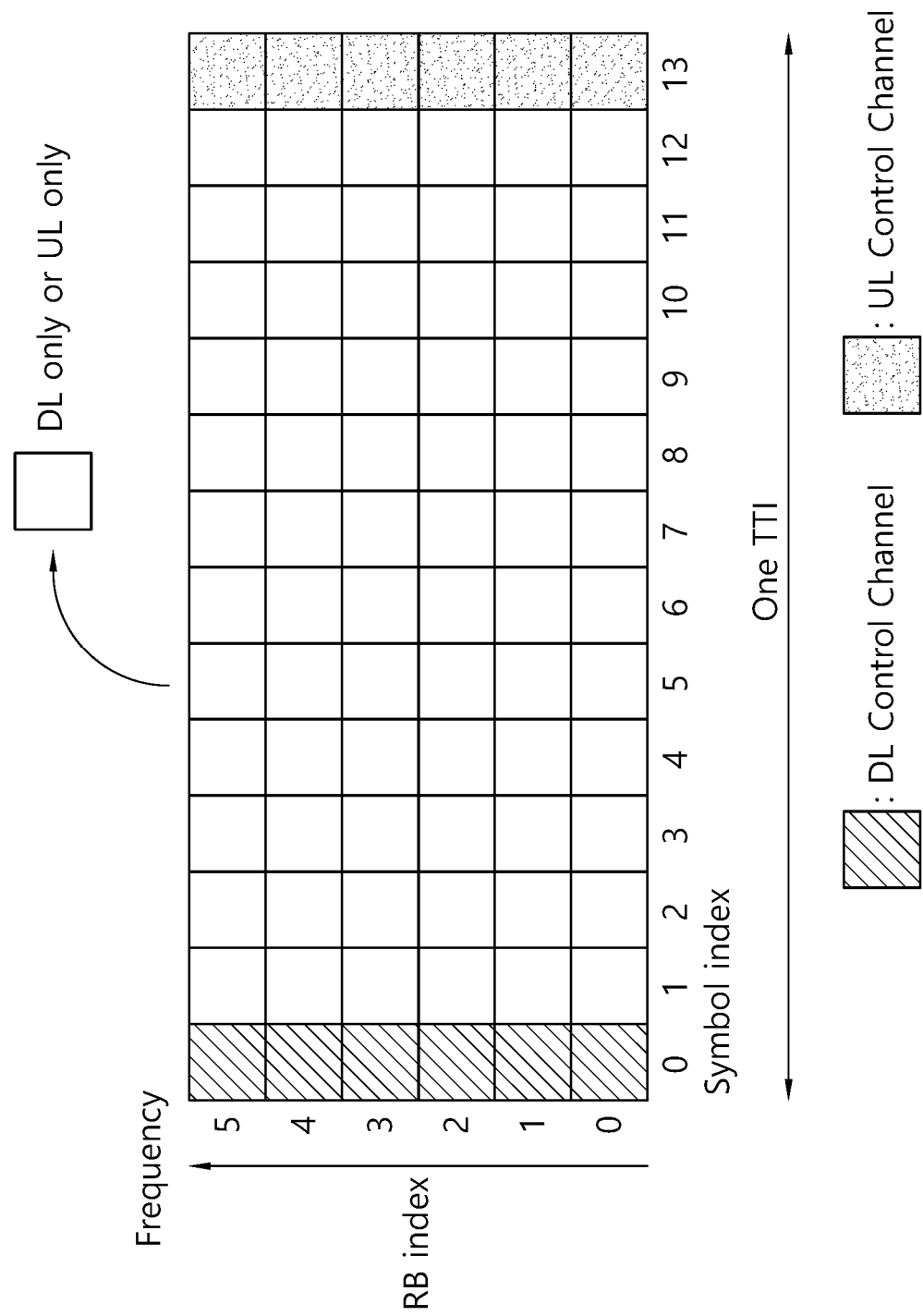
FIG. 4 shows an example of a subframe type in an NR.

FIG. 4 Shows an Example of a Subframe Type in an NR.

A transmission time interval (TTI) shown in FIG. 4 may also be referred to as a new RAT (NR). A subframe (or slot) of FIG. 4 may be used in a TDD system in a new RAT (or NR) in order to minimize data transmission latency. As shown in FIG. 4, just as the current subframe, a subframe (or slot) includes 14 symbols. Symbols located in a front part of the subframe (or slot) may be used for a DL control channel, and symbols located in a rear part of the subframe (or slot) a UL data transmission. According to the above-described subframe (or slot) structure, the downlink transmission and the uplink transmission may be sequentially performed in one subframe (or slot). Therefore, downlink data may be received in the subframe (or slot) and an uplink acknowledgement response (ACK/NACK) may be transmitted from the corresponding subframe (or slot). The above-described subframe (r slot) may also be referred to as a self-contained subframe (or slot). Using the above-described subframe (or slot) structure is advantageous in that it is capable of reducing the time that is consumed for re-transmitting data having reception error, thereby minimizing the final data transmission latency time (or waiting time). In the above-described self-contained subframe (or slot) structure, a time gap may be required during a process of shifting from a Transmission mode to a Reception mode or shifting from a Reception mode to a transmission mode. For this, in the above-described subframe structure, when shifting from a DL to a UL, part of the OFDM symbols may be configured as a Guard Period (GP).

<Support of Diverse Numerology>

In the next generation system, with the evolution of the wireless communication technology, diverse numerology may be provided to a user device (or user equipment (UE)).

Herein, the numerology may be defined by a cycle prefix (CP) length and Subcarrier Spacing. One cell may provide multiple numerologies to the UE. When the index of a numerology is indicated as μ, each subcarrier spacing and the respective CP length are as shown below in the following table.

TABLE 2

| M | Δf = $2^\mu$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In case of a normal CP, when the index of a numerology is indicated as μ, a number of OFDM symbols per slot (Nslotsymb), a number of slots per frame (Nframe,μslot), and a number of slots per subframe (Nsubframe,μslot) are as shown below in the following table.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In case of an extended CP, when the index of a numerology is indicated as μ, a number of OFDM symbols per slot (Nslotsymb), a number of slots per frame (Nframe,μslot), and a number of slots per subframe (Nsubframe,μslot) are as shown below in the following table.

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next generation mobile communication, each symbol within a symbol may be used for a downlink or for an uplink, as shown below in the following table. In the table show below, the uplink is indicated as U, and the downlink is indicated as D. In the following table, X represents a symbol that may be flexibly used for the uplink or the downlink.

TABLE 5

| For-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |

TABLE 5-continued

| For-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | X | U | D | D | X | X | X | X | U |

DISCLOSURE OF THE PRESENT DISCLOSURE

In the next system, a method of significantly reducing a transmission latency according to an application field is considered. In particular, when it comes to uplink (UL) transmission, instead of scheduling by use of an existing physical downlink control channel (PDCCH) (or an enhanced physical downlink control channel (EPDCCH) or an machine-type communication (MTC) physical downlink control channel (MPDCCH)) including a UL grant, introducing grant-free UL transmission in which UL transmission starts by a determination made by a UE, is considered. More specifically, a base station may determine a resource set for enabling the UE to perform grant-free UL transmission and inform the UE of the determined resource set. Accordingly, the UE may start UL transmission even without a UL grant. When the resource set is set, an amount of reserved resources may be increased so as to prevent contention between different UEs. On the contrary, in the case of allowing contention between different UEs, it is necessary to define a procedure of resolving the contention while reducing an amount of reserved resources. Grant-free UL transmission may have more advantages especially in the early stage of burst UL transmission. Here, burst transmission indicates the case of abruptly transmitting data. Accordingly, it is advantageous to transmit data quickly without receiving a UL grant. However, after a predetermined period of time since the start of the transmission, the UE may switch to perform grant-based UL transmission. In a case where the base station is capable of identifying a UE through a time- and frequency resource and/or a demodulation reference signal (DMRS) and/or a scheduling request (SR) and or a preamble, the base station may consider that information on the resource set or RS/preamble for each UE and ID of a corresponding UE (e.g., a cell-radio network temporary identifier (C-RNTI)) are mapped to each other. Meanwhile, as described above, when grant-free UL transmission is switched to grant-based UL transmission, a UE may perform UL transmission based on ID of the UE (that is, UE ID). For example, in the case of applying scrambling and/or CRC masking, UL transmission may be performed based on ID of a UE. However, when contention between different UEs is allowed, in other words, when a plurality of UEs are allowed to be connected or used between predetermined time-frequency resources and/or DMRSs and/or SRs and/or preambles, it may be necessary to define a contention resolving procedure and a method for exchanging ID of the UEs. In the present specification, for convenience of explanation, it is presumed that a DMRS (a transmission time-and-frequency resource and/or a sequence type, and the like) is linked to a predetermined representative ID and that at least whether the same transport block (TB) (UE and/or HARQ process number and/or new data indicator (NDI)) is used between grant-free UL transmission and grant-based UL transmission is identified based on the predetermined representative ID. Hereinafter, a method for enabling UL grant-based UL transmission and a method for exchanging ID of UEs will be proposed.

Information indicated/transmitted by a base station or an operation of the base station or information indicated/transmitted by a UE and the like as described in the present specification are merely examples, and it is apparent that the scope of the present specification may extend and be applied even in the opposite case (where the base station and the UE plays the opposite roles) or in the case of replacement with different nodes.

I. First Disclosure: Representative ID Mapping/Linking Scheme

Basically, a representative ID may be used (1) to identify a UE or (2) to identify a specific TB. In an example where a representative ID is used to identify a UE, when contention between different UEs occurs in the same time-frequency resource, it is possible to control a specific UE to switch to grant-based UL transmission based at least on which UE among the different UEs transmitted the representative ID. Secondly, in an example where a representative ID is used to identify a specific TB, it is possible to link an appropriate UE and a HARQ process number to the representative ID when switching from grant free UL transmission to grant-based UL transmission, for example, by identifying UEs for TBs identified and/or identifying a HARQ process number and/or identifying whether new data is transmitted or re-transmission is performed. The representative ID may be linked to a grant-free UL transmission scheme, and a base station may later on schedule a suitable UL grant from the representative ID linked to the corresponding transmission scheme. The following is a more specific example of a scheme for configuring/setting grant-free UL transmission using a representative ID.

In a first example, a representative ID may be set differently according to a time-frequency resource to which a DMRS is mapped.

In a second example, a representative ID may be set differently according to a sequence for a DMRS (e.g., a root index and/or a cyclic shift (CS), and/or a comb index, and/or a port, and/or an orthogonal cover code (OCC)). Here, the comb index indicates an offset on the frequency axis when the DMRS is transmitted in several RE units in a non-continuous manner.

In a third example, a representative ID may be set differently according to a time-frequency resource to which a DMRS is mapped and a sequence for the DMRS (e.g., a root index and/or a CS, and/or a comb index and/or a port, and/or an OCC).

The UE may randomly select a representative ID and determine a DMRS transmission scheme based on the selected representative ID. In addition, the DMRS is merely exemplary, and the representative ID may be applied even to a different signal (e.g., an SR or a physical random access control channel (PRACH) or other preamble). The representative ID may be applied even to scrambling and/or CRC masking of a UL channel (e.g., a physical uplink shared control channel (PUSCH)) that is allowed to be transmitted in a grant-free scheme. Alternatively, as a different representative ID exists, the different representative ID may be generated in a manner different from a manner of generating a representative ID when a DMRS is set, and the corresponding representative ID may be applied to scrambling and/or CRS masking of a PUSCH. For re-transmission of the same TB after initial transmission, a UE may consider performing re-transmission using the same representative ID used in the initial transmission, and a DMRS generating scheme (for a reason of randomization and the like) may be different even in the case of using the same representative ID according to a point in time.

II. Second Disclosure: Grant-Based UL Transmission Scheme

Even in a case where grant-free UL transmission corresponds to initial transmission, after a base station recognizes the presence of a corresponding UE or TB, it may be advantageous to switch to grant-based UL transmission in terms of scheduling flexibility, contention, spectral efficiency, and the like. If it is possible to identify a UE using a representative ID, transmission of a UL grant and a PUSCH for a grant-based UL transmission scheme may be considered to be set based on the ID of the UE (e.g., a C-RNTI). For example, as for the UL grant, scrambling and/or CRC masking and/or a search space (SS) may be linked to the ID of the UE. In addition, scrambling and/CRC masking of the PUSCH may be linked to the ID of the UE. However, the above-described method may require excessive representative IDs and accordingly an amount of resources to be reserved may be increased again. As a scheme for reducing the amount of resources to be reserved, linking a single representative ID to a plurality of UEs or allowing a UE to randomly select a representative ID may be considered. In this situation, transmitting a UL physical channel, which is transmitted in a grant-based manner, based on ID of the UE may be inefficient. Accordingly, it is possible to set scrambling and/or CRC masking and/or an SS based on a third ID. [95] More specifically, when switching from the grant-free UL transmission scheme to the grant-based UL transmission, a corresponding UL grant may set scrambling and/or CRC masking and/or an SS based on a representative ID used in the grant-free transmission scheme.

In a specific example, a downlink control (DL) channel (e.g., a physical downlink control channel (PDCCH) or an enhanced physical downlink control channel (EPDCCH)) through which DCI including the UL grant is transmitted may be scrambled by a scrambling sequence. Here, the scrambling sequence may be initialized by the following Equation.

$$C_{init} = (n_{RNTI} \cdot 2^{16} + n_{ID}) \bmod 2^{31}$$ [Equation 1]

Here, nID may be a representative ID, as described above. In addition, nRNTI may be a C-RNTI.

Likewise, PUSCH transmission regarding a UL grant may enable scrambling and/or CRC masking to be performed based on a representative ID. More specifically, in a case where UL channels transmitted in a grant-based manner are set based on a representative ID, initial transmission or previous transmission regarding a corresponding TB may correspond to grant-free UL transmission (re-transmission). In a case where a new TB is scheduled or transmitted, scrambling and/or CRC masking and/or an SS may be set based on an ID of a UE. Specifically, a PUSCH transmitted through grant-free UL transmission may include information on the ID of the UE (e.g., a C-RNTI) when it comes to transmitting a UL-SCH. A UE expecting grant-based UL transmission set by a representative ID may at the same time expect grant-based UL transmission set by the ID of the UE. However, in order to reduce blind decoding (BD) attempts of a PDCCH including a UL grant, scrambling may not be linked to the ID of the UE and the representative ID and CRC masking may be set alone. Here, sizes of DCI including UL grants may be identical.

Meanwhile, when the grant-free UL transmission scheme is switched to the grant-based UL transmission scheme, a first UL grant may be transmitted through a PDSCH. More specifically, a PDCCH/PDSCH may be set based on a representative ID, whilst a UL grant may be transmitted through the PDSCH. Specifically, the representative ID for the PDCCH/PDSCH may be set to be different according to a time and/or frequency resource for grant-free UL transmission.

Specifically, according to whether grant-based UL transmission corresponds to transmission of new data or re-transmission regarding grant-free UL transmission, a different ID is used in data scrambling and/or CRC masking and/or an SS. More specifically, in the case of re-transmission regarding grant-free UL transmission, the grant-free UL transmission scheme is based on the ID, and, in the case of transmission of new data, the grant-free UL transmission scheme is performed based on an ID of a corresponding UE (e.g., a C-RNTI).

III. Third Disclosure: UE ID Exchanging Procedure

A grant-based UL transmission scheme may be effective since UL grant is scheduled and a PUSCH is transmitted under the control of a base station (without contention between different UEs). In this case, transmission of the UL grant and the PUSCH may be performed based on an ID of a UE (e.g., a C-RNTI). In consideration of the case of switching from a grant-free UL transmission scheme to a grant-based UL transmission scheme, if grant-based UL transmission is initially performed using a representative ID, it is necessary to define a scheme for handling collision occurring due to use of the same representative ID by different UEs (e.g., contention resolution) and/or a scheme for exchanging IDs of UEs. In a simple example, when the grant-free UL transmission scheme is used, 1) transmitting a PUSCH including UE ID information of a corresponding UE may be considered. In this case, the ID information of the UE may be acquired only when a base station successfully detects the corresponding PUSCH. Once the ID information of the UE is acquired, UL grant scheduling and/or a corresponding PUSCH transmitting scheme may be performed based on the ID of the UE. In other cases, the base station may transmit a UL grant based on a representative ID and the UE may compare the representative ID for the UL grant with a representative ID selected by the UE for previous transmission and, if a match is found, transmit the PUSCH again based on the representative ID.

In another example, 1) it may be considered that when a UE performs grant-free UL transmission using a representative ID, a fbase station transmits a PDCCH and a PDSCH based on the representative ID. That is, scrambling and/or CRC masking and/or an SS may be determined based on the representative ID. Specifically, the base station may include, in a PDSCH, a UL grant and/or a temporary C-RNTI and/or a TA and/or a representative ID for grant-free UL transmission and then transmit the PDSCH. After detecting the UL grant, the UE may detect the used representative ID from a PDCCH/PDSCH transmission scheme or information included in the PDSCH. In addition, when the UE performs grant-free UL transmission, the UE may compare the detected representative ID with a selected/used representative ID and, only when the detected representative ID coincides with the selected/used representative ID, transmit the PPUSCH according to the corresponding UL grant. Scrambling and/or CRC masking of the PUSCH may be determined based on the representative ID or a temporary C-RNTI included in the PDSCH. In a case where a plurality of UEs selects and uses the same representative ID, an ID for contention resolution or an ID of a UE may be included in the PUSCH and transmitted in order to identify the plurality of UEs. The base station may transmit a PDCCH/PDSCH again, and scrambling and/or CRC masking and/or an SS of the corresponding PDCCH/PDSCH may be set based on an ID used in transmission of the PUSCH (e.g., a representative Id or a temporary C-RNTI). In addition, the PDSCH may include a value identical to the contention resolution ID transmitted in the previous PUSCH or the ID of the UE, and, in response to receiving the PDSCH, the UEs may perform a procedure for contention resolution. Only when the contention resolution ID or the ID of the UE are identical between the PDSCH and the PUSCH, the base station may transmit a PDCCH to the corresponding UE. At this point, scrambling and/or CRC masking and/or an SS may be set based on the ID of the UE or a temporary C-RNTI (which may be indicated as the ID of the UE).

IV. Fourth Disclosure: Power Control Between Grant-Based UL Transmission Scheme and Grant-Free UL Transmission Scheme Grant-free UL transmission is not UL grant-based transmission, and thus, it may be not possible to flexibly vary power by receiving a transmit power control (TPC) from a UL grant. Accordingly, in the next system, similarly to DCI format 3/3A in the LTE system, transmitting a value of TPC for grant-free UL transmission through a third DCI format or a PDCCH may be considered. Since transmitting each TPC to a different channel according to an arrival rate may be inefficient in terms of overheads, transmitting each TPC in a group common or UE-group-specific manner may be considered. Specifically, TPC management regarding grant-free UL transmission may differ according to the presence of a grant and/or an application. More specifically, TPCs may be operated separately between SPS transmission and grant-free UL transmission. Alternatively, a TPC may be operated separately according to an ID of a UE for a PUSCH (e.g., a C-RNTI and SPS C-RNTIs). Separately operating a TPC may not indicate that all TPCs before a predetermined point in time are subject to be accumulated, but may indicate that TPCs are used distinctively according to an ID of a UE. More specifically, according to an application or service requirement (e.g., a latency and/or reliability), an ID for use in data scrambling and/or CRC masking may be set differently and independently. According to the ID, a TPC may be used distinctively. In the assumption that a plurality of TPCs is transmitted through the same channel, a single TPC may be included alone for a specific UE and the plurality of TPCs may be included for the specific UE (for each service) in consideration of a control overhead. In the above case, a TPC for each ID may be adjusted and set in advance in a higher layer and information on ID may be included together in DCI that transits the TPC.

In the case of switching to grant-based UL transmission after grant-free UL transmission, TPC management may be performed differently according to ID setting. If IDs are identical between the two types of transmission, the transmission may be performed in a manner in which the TPCs share the ID. On the other hand, if IDs are different, the TPCs themselves may be operated separately. However, for a particular UE, a power value initially used in the switch to the grant-based UL transmission may not be accurate, and it is necessary to all or part of power information used in the latest grant-free UL transmission. For example, in a case where the grant-free UL transmission is recognized (that is, when a transmitter UE is detected although data reception is failed), all or part of terms of an equation for open loop power control for the grant-based UL transmission may be replaced with all or part of power control terms for the grant-free UL transmission. The above proposal may be applied as a case where TTIs and/or numerologies are identical between the grant-based UL transmission and the grant-free UL transmission.

In the next system, introducing a power ramping technique for the grant-free UL transmission may be considered. Here, power ramping may be performed in the following manner.

In a first example, a UE may perform grant-free UL transmission until detecting a UL grant for the corresponding UE and/or TB. At this point, in a case where a UL channel is transmitted repeatedly, power ramping may be performed during a repetition. This may be applied as a case where TTIs and/or numerologies are identical between grant-based UL transmission and the grant-free UL transmission. The power ramping may be performed at every TTI and may be performed at a predetermined number of two or more TTIs. A TTI unit at which the power raping is performed may be indicated by a higher layer signal and/or an L1 signal. In addition, information on a unit of increasing power during power ramping may be indicated by a higher layer signal and/or an L1 signal (e.g., DCI). More specifically, a power ramping unit in a repetition and a power ramping unit between repetitions may be set differently and independently.

In a second example, a UE may perform grant-free transmission until detecting a UL grant for the corresponding UE and/or TB. At this point, if a UL channel is transmitted repeatedly, power ramping may be performed between repetitions. In this case, power ramping may not be performed in a repetition. This may be applied as a case where TTIs and/or numerologies are identical between grant-based UL transmission and the grant-free UL transmission. A TTI unit at which the power ramping is performed may be indicated by a higher layer signal and/or an L1 signal. In addition, a unit of increasing power in the power ramping may be indicated by a higher layer signal and/or an L1 signal.

In a case where power ramping is applied, a recently power ramped value may be included in a term of an equation for open-loop power control when UL grant-based UL transmission is controlled afterward.

In the exemplary description presented above, although solutions (or methods) are described based on a flowchart including a series of steps or blocks, the disclosure of this specification will not be limited only to an order of the above-described steps. Some steps may be generated in a different order or simultaneously with the above other steps. Furthermore, it will be apparent to anyone skilled in the art that the steps included in the flowchart are not exclusive but include other steps or that one or more steps in the flowchart may be eliminated (or removed) without exerting influence on the scope and spirit of the present disclosure.

The above-described exemplary embodiments of the present disclosure may be implemented by using diverse means. For example, the exemplary embodiments of the present disclosure may be implemented in the form of hardware, firmware, and software, or in a combined form of any of the above. This will be described in more detail with reference to the appended drawings.

Figure 5:
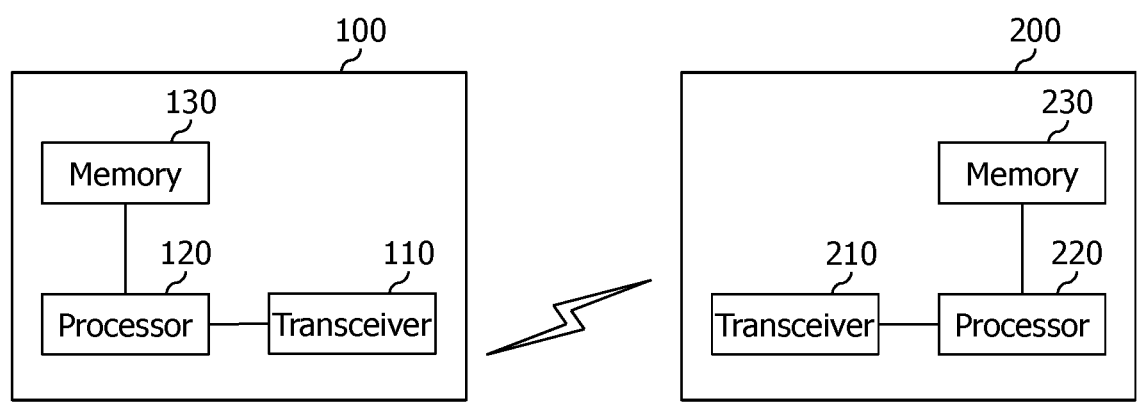
FIG. 5 is a block diagram illustrating a wireless device and a base station in which the disclosure of the present disclosure is implemented.

FIG. 5 is a block diagram showing a wireless device and a base station in which a disclosure of this specification is implemented.

Referring to FIG. 5, the wireless device (100) and the base station (200) may implement the disclosure of this specification.

As shown in the drawing, the wireless device (100) includes a processor (120), a memory (130), and a transceiver (110). Similarly, as shown in the drawing, the base station (200) includes a processor (220), a memory (230), and a transceiver (210). The processors (120, 220), the memories (130, 230), and the transceivers (110, 210) may each be implemented as a separate chip or at least two or more blocks/functions may be implemented by a single chip.

The transceiver (110, 210) includes a transmitter and a receiver. In case a specific operation is being performed, any one of the transmitter and the receiver may be operated, or both the transmitter and the receiver may be operated. The transceiver (110, 210) may include one or more antennas transmitting and/or receiving radio signals. Additionally, the transceiver (110, 210) may include an amplifier that is used for amplifying a reception signal and/or a transmission signal, and a band-pass filter that is used for performing transmission to a specific frequency band.

The processor (120, 220) may implement the functions, processes, and/or methods that are proposed in this specification. The processor (120, 220) may include an encoder and a decoder. For example, the processor (120, 220) may perform the operations according to the description presented above. The above-described processor (120, 220) may include an application-specific integrated circuit (ASIC), another chip set, a logical circuit, a data processing device, and/or a converter converting a baseband signal and a radio signal to and from one another.

The memory (130, 230) may include a read-only memory (ROM), a random access memory (RAM), a flash memory, a memory card, a storage medium, and/or another storage device.

Figure 6:
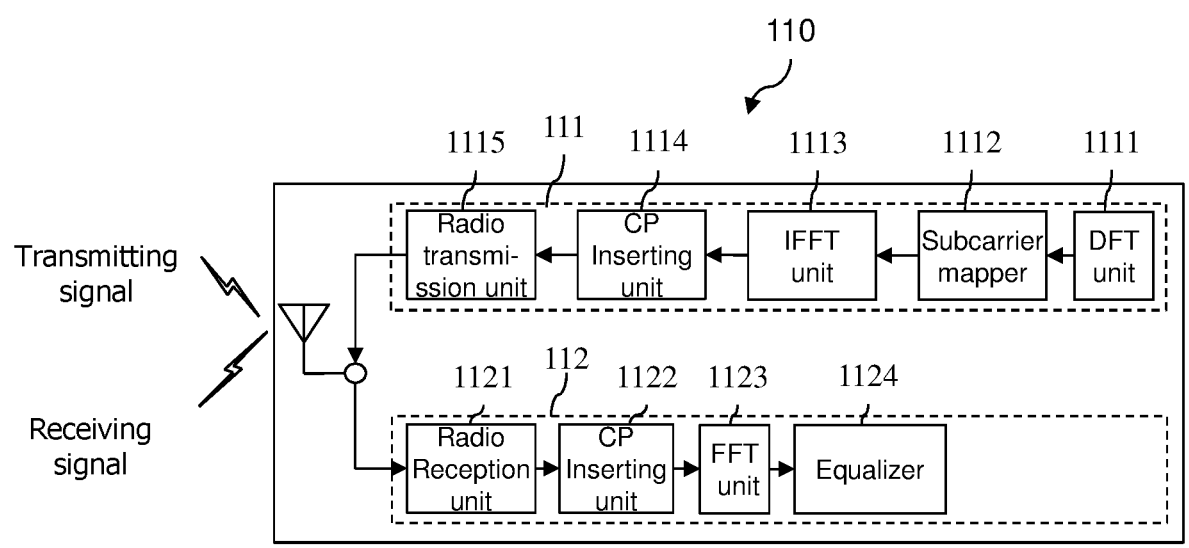
FIG. 6 is a detailed block diagram of a transceiver of the wireless device illustrated in FIG. 5.

FIG. 6 is a detailed block diagram of a transceiver included in the wireless device shown in FIG. 5.

Referring to FIG. 6, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method for performing wireless communication by a user equipment (UE), the method including:
   receiving resource set configuration information related to a demodulation reference signal (DMRS) from a base station;
   determining a first identification (ID) based on the resource set configuration information;
   transmitting, to the base station, a first physical uplink shared channel (PUSCH) including the DMRS through a grant-free uplink (UL) transmission, the DMRS being related to the first ID;
   receiving, from the base station, a downlink control channel including an UL grant for a second PUSCH, the UL grant being related to the first ID; and
   transmitting the second PUSCH through a grant-based UL transmission based on the UL grant,
   wherein the first ID is different from a second ID for identifying the UE,
   wherein a first scrambling, a first cyclic redundancy check (CRC) masking and a search space for the UL grant are related to the first ID,
   wherein, based on the grant-free UL transmission and the grant-based UL transmission being performed based on a same transport block (TB), a second scrambling and a second CRC masking for the second PUSCH are related to the first ID,
   wherein the grant-free uplink transmission is initiated based on a determination by the UE,
   wherein the grant-free UL transmission is repeated until the UL grant is received by the UE, and wherein a first power ramping is performed in at least one transmission time interval (TTI) before repeating the grant-free UL transmission and a second power ramping is performed during the repeated grant-free UL transmission.

2. A user equipment (UE) for performing wireless communication, comprising:
at least one memory storing instructions;
at least one transceiver; and
at least one processor operatively coupling the at least one memory and the at least one transceiver, wherein the at least one processor is configured to:
control the at least one transceiver to receive resource set configuration information related to a demodulation reference signal (DMRS) from a base station,
determine a first identification (ID) based on the resource set configuration information;
control the at least one transceiver to transmit, to the base station, a first physical uplink shared channel (PUSCH) including the DMRS through a grant-free uplink (UL) transmission, the DMRS being related to the first ID,
control the at least one transceiver to receive a downlink control channel, and
control the at least one transceiver to transmit the second PUSCH through a grant-based UL transmission based on the UL grant,
wherein the first ID is different from a second ID for identifying the UE,
wherein a first scrambling, a first cyclic redundancy check (CRC) masking and a search space for the UL grant are related to the first ID,
wherein, based on the grant-free UL transmission and the grant-based UL transmission being performed based on a same transport block (TB), a second scrambling and a second CRC masking for the second PUSCH are related to the first ID,
wherein the grant-free uplink transmission is initiated based on a determination by the UE,
wherein the grant-free UL transmission is repeated until the UL grant is received by the UE, and
wherein a first power ramping is performed in at least one transmission time interval (TTI) before repeating the grant-free UL transmission and a second power ramping is performed during the repeated grant-free UL transmission.

3. The method of claim 1, based on the grant-free UL transmission being performed based on a first TB and the grant-based UL transmission being performed based on a second TB, which is different from the first TB, the second scrambling and the second CRC masking for the second PUSCH are related to the second ID.

4. The method of claim 1, wherein the first PUSCH includes the second ID.

5. The method of claim 4, wherein the second ID is related to a cell-radio network temporary identity (C-RNTI).

6. The method of claim 1, wherein the first ID is related to a time and frequency resource to which the DMRS is mapped.

7. The method of claim 1, wherein the first ID is related to a sequence for the DMRS.

8. The method of claim 1, wherein the first ID is related to both a sequence for the DMRS and a time and frequency resource to which the DMRS is mapped.

9. The method of claim 1, wherein the at least one TTI is determined based on higher layer signaling.

10. The UE of claim 2, based on the grant-free UL transmission being performed based on a first TB and the grant-based UL transmission being performed based on a second TB, which is different from the first TB, the second scrambling and the second CRC masking for the second PUSCH are related to the second ID.

11. The UE of claim 2, wherein the first PUSCH includes the second ID.

12. The UE of claim 11, wherein the second ID is related to a cell-radio network temporary identity (C-RNTI).

13. The UE of claim 2, wherein the first ID is related to a time and frequency resource to which the DMRS is mapped.

14. The UE of claim 2, wherein the first ID is related to a sequence for the DMRS.

15. The UE of claim 2, wherein the at least one TTI is determined based on higher layer signaling.

* * * * *